United States Patent [19]

Jaffe

[11] 3,953,364

[45] Apr. 27, 1976

[54] THERMACTIVATION OF CATALYSTS COMPRISING CATALYTIC METALS-FREE CRYSTALLINE ZEOLITIC MOLECULAR SIEVE PARTICLES DISPERSED IN A GEL MATRIX

[75] Inventors: Joseph Jaffe, Berkeley, Calif.

[73] Assignee: Chevron Research Company, San Francisco, Calif.

[22] Filed: July 29, 1970

[21] Appl. No.: 64,099

Related U.S. Application Data

[63] Continuation of Ser. No. 757,503, Sept. 4, 1968, abandoned.

[52] U.S. Cl. ............................. 252/455 Z; 208/111
[51] Int. Cl.$^2$ .................. B01J 29/06; C10G 13/02
[58] Field of Search ................. 252/455 Z; 208/111

[56] References Cited
UNITED STATES PATENTS

| 3,433,732 | 3/1969 | Leaman | 208/111 |
|---|---|---|---|
| 3,457,191 | 7/1969 | Erickson et al. | 252/455 |
| 3,558,471 | 1/1971 | Kittrell | 252/455 X |
| 3,558,475 | 1/1971 | Jaffe | 252/455 X |

*Primary Examiner*—Carl F. Dees
*Attorney, Agent, or Firm*—G. F. Magdeburger; R. H. Davies; D. L. Hagmann

[57] ABSTRACT

Method of activating a catalyst composite comprising particles of a catalytic metals-free crystalline zeolitic molecular sieve dispersed in a gel matrix comprising silica-alumina, a Group VI hydrogenating component and a Group VIII hydrogenating component, which method comprises heating said catalyst composite in an oxygen-containing gas stream at 1200° to 1600°F. for 0.25 to 48 hours, and the catalyst composite so activated.

4 Claims, No Drawings

THERMACTIVATION OF CATALYSTS COMPRISING CATALYTIC METALS-FREE CRYSTALLINE ZEOLITIC MOLECULAR SIEVE PARTICLES DISPERSED IN A GEL MATRIX

RELATED APPLICATION

This application is a continuation of patent application Ser. No. 757,503 filed Sept. 4, 1968, now abandoned.

INTRODUCTION

In Joseph Jaffe copending application Ser. No. 749,836, filed Aug. 2, 1968, for "Hydrotreating Catalyst and Process," there is described a novel and unusually effective hydrofining-hydrocracking catalyst. Said catalyst comprises a crystalline zeolitic molecular sieve component substantially free of any catalytic metal or metals, a silica-containing gel component, a Group VI hydrogenating component, and a component selected from titanium, zirconium, thorium, hafnium, and compounds thereof. It has now been found that catalysts of this general type, either with or without a Group IV component, can be even further improved in various respects by a novel heat treatment procedure, which serves both to activate and stabilize the catalyst. Said heat treatment procedure, hereinafter for convenience called an activation or thermactivation treatment or procedure, is applied to the total catalyst composite, following dispersion of the crystalline zeolitic molecular sieve component in the gel matrix.

STATEMENT OF INVENTION

In accordance with the present invention catalysts of the aforesaid type are thermactivated in an oxygen-containing gas stream at temperatures in the range 1,200° to 1,600°F., preferably 1,250° to 1,400°F., for 0.25 to 48 hours. The oxygen-containing gas stream, which may be air, preferably is as dry as practicable. The improved results obtainable with the process of the present invention are optimized as the gas stream becomes extremely dry; although for most practical purposes the gas stream need be only as dry as ambient air, greater dryness is preferred. Those skilled in the art will be aware of various methods for drying the gas stream to any desired extent.

Although the process of the present invention is applicable to activation of catalysts of the aforesaid type with a wide range of silica content, it is especially useful with such catalysts that contain less than 40 weight percent silica in the total catalyst, and less than 35 weight percent silica in the catalyst matrix.

Further in accordance with the present invention there is provided the method of activating a catalyst composite comprising:

A. A gel matrix comprising:
a. at least 15 weight percent silica,
b. alumina, in an amount providing an aluminum-to-silica weight ratio of 15/85 to 80/20,
c. nickel or cobalt, or the combination thereof, in the form of metal, oxide, sulfide or any combination thereof, in an amount of 1 to 10 weight percent of said matrix, calculated as metal,
d. molybdenum or tungsten, or the combination thereof, in the form of metal, oxide, sulfide or any combination thereof, in an amount of 5 to 25 weight percent of said matrix, calculated as metal;

B. A crystalline zeolitic molecular sieve substantially in the ammonia or hydrogen form, substantially free of any catalytic loading metal or metals, said sieve further being in particulate form and being dispersed through said matrix;

said catalyst composite being further characterized by an average pore diameter below 100 Angstroms and a surface area above 200 square meters per gram;

which method comprises heating said catalyst composite in an oxygen-containing gas stream at temperatures in the range 1200° to 1600°F. for 0.25 to 48 hours.

Further in accordance with the present invention there is provided a catalyst composite comprising:

A. A gel matrix comprising:
a. at least 15 weight percent silica,
b. alumina, in an amount providing an alumina-to-silica weight ratio of 15/85 to 80/20,
c. nickel or cobalt, or the combination thereof, in the form of metal, oxide, sulfide or any combination thereof, in an amount of 1 to 10 weight percent of said matrix, calculated as metal,
d. molybdenum or tungsten, or the combination thereof, in the form of metal, oxide, sulfide or any combination thereof, in an amount of 5 to 25 weight percent of said matrix, calculated as metal;

B. A crystalline zeolitic molecular sieve substantially in the ammonia or hydrogen form, substantially free of any catalytic loading metal or metals, said sieve further being in particulate form and being dispersed through said matrix;

said catalyst composite being further characterized by an average pore diameter below 100 Angstroms and a surface area above 200 square meters per gram; said catalyst composite being further characterized by hydrocracking activities and stabilities developed therein by heating said catalyst composite in an oxygen-containing gas stream at temperatures in the range 1200° to 1600°F. for 0.25 to 48 hours.

The gel matrix of the aforesaid catalyst composite additionally may comprise titanium, zirconium, thorium, hafnium, or any combination thereof, in the form of the metal, oxide, sulfide or any combination thereof, in an amount of 1 to 10 weight percent of said matrix, calculated as metal.

The reference to a crystalline zeolitic molecular sieve "substantially free of any catalytic loading metal or metals" means that the molecular sieve contains no more than 0.5 weight percent of catalytic metal or metals, based on the sieve. The catalytic metal or metals include the Group VI and VIII metals, excluding sodium.

EXAMPLES

The following examples are given for the purpose of further illustrating the process and catalyst of the present invention, without limiting the scope thereof.

Example 1

A cogelled catalyst (Catalyst A) of the following composition was prepared:

| Component | Wt. % of Total Catalyst |
|---|---|
| NiO | 8.2 |
| $WO_3$ | 18.2 |
| $TiO_2$ | 5.6 |
| $Al_2O_3$ | 24.0 |
| $SiO_2$ | 24.0 |

-continued

| Component | Wt. % of Total Catalyst |
|---|---|
| Crystalline zeolitic molecular sieve, "Y" form | 20.0 |
| Total | 100.0 |

The catalyst was prepared by the following steps, using sufficient quantities of the various starting materials to produce the above-indicated weight percentages of the components of the final catalyst:

1. An aqueous acidic solution was prepared, containing $AlCl_3$, $TiCl_4$, $NiCl_2$ and acetic acid.
2. Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components would occur at a neutral pH of about 7.
3. The acidic and alkaline solutions were combined, and coprecipitation of all of the metal-containing components of those solutions occurred at a pH of about 7, resulting in a slurry.
4. Linde "Y" crystalline zeolite molecular sieve in finely divided form was added to the slurry.
5. The molecular sieve-containing slurry was filtered to produce a molecular sieve-containing hydrogel filter cake, which was washed repeatedly with dilute ammonium acetate solution to remove sodium and chloride ionic impurities from both the hydrogel and the molecular sieve contained therein.
6. The molecular sieve-containing hydrogel was dried in an air-circulating oven and then was activated in flowing air at 950°F. for 5 hours.

The finished catalyst was characterized by a surface area of about 400 $M^2/g$., a pore volume of about 0.4 cc./g., an average pore diameter of about 40 Angstroms, and a molecular sieve component substantially free of catalytic metals; that is, substantially all of the nickel, tungsten and titanium in the catalyst was located in the gel portion of the catalyst rather than in the molecular sieve component thereof.

Example 2

A cogelled catalyst (Catalyst B), of exactly the same composition as Catalyst A of Example 1, was prepared. The catalyst was prepared in exactly the same manner as Catalyst A of Example 1 except that upon completion of the activation at 950°F. for 5 hours the catalyst was further activated at 1,275°F. for 2 hours.

The finished catalyst was characterized by a surface area of about 350 $M^2/g$., a pore volume of about 0.4 cc./g., an average pore diameter of about 40 Angstroms. The molecular sieve component remained substantially free of catalytic metals.

Example 3

A cogelled catalyst (Catalyst C, a comparison catalyst) was prepared. The composition was similar to that of Catalyst A of Example 1 except that it contained only 10 weight percent of crystalline zeolitic molecular sieve and the weight percentages of the other components were proportionally adjusted. Catalyst C was prepared in exactly the same manner as Catalyst A of Example 1, including a final activation treatment in flowing air at 950°F. for 5 hours.

Example 4

A cogelled catalyst (Catalyst D) of the following composition was prepared:

| Component | Wt. % of Total Catalyst |
|---|---|
| NiO | 11.4 |
| $WO_3$ | 11.3 |
| $ZrO_2$ | 9.0 |
| $Al_2O_3$ | 27.0 |
| $SiO_2$ | 31.3 |
| Crystalline zeolitic molecular sieve, sodium "Y" form | 10.0 |
| Total | 100.0 |

The catalyst was prepared in exactly the same manner as Catalyst A of Example 1, except that $ZrOCl_2$ was used instead of $TiCl_4$. The final activation treatment, as in the case of Catalyst A of Example 1, was in flowing air at 950°F. for 5 hours.

The finished catalyst was characterized by a surface area of 420 $M^2/g$., a pore volume of 0.347, an average pore diameter of 33 Angstroms, and a molecular sieve component substantially free of catalytic metals; that is, substantially all of the nickel, tungsten and zirconium in the catalyst was located in the gel portion of the catalyst rather than in the molecular sieve component thereof.

Example 5

A cogelled catalyst (Catalyst E), of exactly the same composition as Catalyst D of Example 4, was prepared. The catalyst was prepared in exactky the same manner as Catalyst D of Example 4, except that upon completion of the activation at 950°F. for 5 hours the catalyst was further activated at 1350°F. for 2 hours.

The finished catalyst was characterized by a surface area of 374 $M^2/g$., a pore volume of 0.353, and an average pore diameter of 38 Angstroms. The molecular sieve component remained substantially free of catalytic metals.

Example 6

Catalysts A and C of Examples 1 and 3, respectively, were separately used to hydrocrack separate portions of a light cycle oil of the following description:

| | |
|---|---|
| Gravity, °API | 19.5 |
| Aniline point, °F. | 62 |
| Sulfur content, wt.% | 0.43 |
| Nitrogen content, ppm | 330 |
| ASTM D-1160 Distillation | |
| ST/5 | 381/471 |
| 10/30 | 492/532 |
| 50 | 568 |
| 70/90 | 598/635 |
| 95/EP | 648/681 |

The hydrocracking was accomplished at the following conditions:

| | |
|---|---|
| Hydrogen pressure, psig | 1100 |
| Per-pass conversion to products boiling below 400°F., vol.% | 80 |
| Liquid Hourly Space Velocity | 0.9 |
| Starting temperature | As indicated below |

The hydrocracking was accomplished on a recycle basis, that is, with recycle to the hydrocracking zone from the effluent thereof materials boiling above 400°F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, were:

|  | Catalyst A | Catalyst C |
|---|---|---|
| Operating temperature, °F. | 725 | 725 |
| Fouling rate, °F./hr. | 0.07 | 0.03 |

From the foregoing, it may be seen that Catalyst A is as active as comparison Catalyst C, but that it has poor stability compared with Catalyst C.

Example 7

Catalysts B and C of Examples 2 and 3, respectively, were separately used to hydrocrack separate portions of a gas oil of the following description:

| Gravity, °API | 29.0 |
|---|---|
| Aniline point, °F. | 165 |
| Sulfur content, wt.% | 1.9 |
| Nitrogen content, ppm | 390 |
| ASTM D-1160 Distillation | |
| ST/5 | 486/551 |
| 10/30 | 577/629 |
| 50 | 674 |
| 70/90 | 716/791 |
| 95/EP | 825/948 |

The hydrocracking was accomplished at the following conditions:

| Hydrogen pressure, psig | 1300 |
|---|---|
| Per-pass conversion to products boiling below 550°F., vol.% | 70 |
| Liquid hourly space velocity v/v/hr. | 1.5 |
| Starting temperature | As indicated below |

The hydrocracking was accomplished on a recycle basis, that is, with recycle to the hydrocracking zone from the effluent thereof materials boiling above 550°F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, were:

|  | Catalyst B | Catalyst C |
|---|---|---|
| Operating Temperature, °F. | 705 | 706 |
| Fouling rate, °F./Hr. | 0.02 | 0.02 |

From the foregoing, it may be seen that Catalyst B has essentially the same activity and the same stability as comparison Catalyst C. Accordingly, the heat treatment activation of Catalyst A at 1275°F. for 2 hours resulted in a catalyst, Catalyst B, having a stability markedly better than that of Catalyst A, and this was achieved without harm to the activity of the catalyst.

Example 8

Catalysts D and E of Examples 4 and 5, respectively, were separately used to hydrocrack separate portions of a hydrofined Mid-Continent straight-run gas oil of the following description:

| Gravity, °API | 31.5 |
|---|---|
| Aniline point, °F. | 172 |
| Nitrogen content, ppm | 0.44 |
| Boiling range, °F. | 400–800 |

The hydrocracking was accomplished at the following conditions:

| Temperature, °F. | 570 |
|---|---|
| Liquid hourly space velocity | 2 |
| Total pressure, psig | 1,200 |
| Total gas rate, SCF/bbl. | 12,000 |

After 98 hours on stream, the activity indices of the two catalysts were determined. In each case, the activity index was defined as the difference between the API gravity of the liquid product and the API gravity of the liquid feed. The results were:

|  | Catalyst D | Catalyst E |
|---|---|---|
| Activity Index | 14.9 | 20.2 |

From the foregoing, it may be seen that Catalyst E had a greater hydrocracking activity than Catalyst D. Accordingly, the heat treatment activation of Catalyst D at 1350°F. for 2 hours resulted in a catalyst, Catalyst E, having an activity index markedly better than that of Catalyst D.

CONCLUSIONS

Applicants do not intend to be bound by any theory for the unexpectedly superior activities and stabilities of the catalysts treated according to the process of the present invention. They assume that the favorable results are largely attributable to, and unique to, the particular combination of catalytic components used, in further combination with the particular method by which the thermactivation treatment is conducted.

Although only specific embodiments of the present invention have been described, numerous variations can be made in these embodiments without departing from the spirit of the invention, and all such variations that fall within the scope of the appended claims are intended to be embraced thereby.

What is claimed is:
1. A catalyst composite comprising:
   A. A gel matrix comprising:
      a. at least 15 weight percent silica,
      b. alumina, in an amount providing an alumina-to-silica weight ratio of 15/85 to 80/20,
      c. nickel or cobalt, or the combination thereof, in the form of metal, oxide, sulfide, or any combination thereof, in an amount of 1 to 10 weight percent of said matrix, calculated as metal,
      d. molybdenum or tungsten, or the combination thereof, in the form of metal, oxide, sulfide, or any combination thereof, in an amount of 5 to 25 weight percent of said matrix, calculated as metal;

B. A crystalline zeolitic molecular sieve substantially in the ammonia or hydrogen form, substantially free of any catalytic loading metal or metals, said sieve further being in particulate form and being dispersed through said matrix;

said catalyst composite being further characterized by an average pore diameter below 100 Angstroms and a surface area above 200 square meters per gram;

said catalyst composite being further characterized by hydrocracking activities and stabilities developed therein by heating said catalyst composite in an oxygen-containing gas stream at temperatures in the range 1200°F. to 1600°F. for 0.25 to 48 hours.

2. A catalyst composite as in claim 1 wherein said gel matrix further comprises titania.

3. A catalyst comprising a silica-alumina matrix having dispersed in it particles of a low-sodium molecular sieve zeolite, the silica-alumina matrix having dispersed in it a Group VI metal or metal compound and a Group VIII metal or metal compound and the zeolite being substantially free of chemically or physically bonded metals or metal compounds having appreciable catalytic activity for hydrogenation; said catalyst being further characterized by hydrocracking activities and stabilities developed therein by heating said catalyst in an oxygen-containing gas stream at temperatures in the range 1200° to 1600°F. for 0.25 to 48 hours.

4. A catalyst comprising a crystalline zeolitic molecular sieve of the ammonia or hydrogen form and substantially free of metals or metal compounds having catalytic activity for hydrogenation dispersed in a hydrocracking catalyst matrix comprised of silica-alumina having dispersed in it 1 to 10% by weight of nickel in the formm of metal, metal oxide or metal sulfide and 5 to 25% by weight of molybdenum or tungsten in the form of metal, metal oxide or metal sulfide, said catalyst being further characterized by hydrocracking activities and stabilities developed therein by heating said catalyst in an oxygen-containing gas stream at temperatures in the range 1200° to 1600°F. for 0.25 to 48 hours.

* * * * *

UNITED STATES PATENT AND TRADEMARK OFFICE
CERTIFICATE OF CORRECTION

PATENT NO. : 3,953,364
DATED : April 27, 1976
INVENTOR(S) : Joseph Jaffe

It is certified that error appears in the above-identified patent and that said Letters Patent are hereby corrected as shown below:

Col. 2, line 34, "per gram; said" should read

--per gram; which method comprises heating said catalyst composite in an oxygen-containing gas stream at temperatures in the range 1200° to 1600°F. for 0.25 to 48 hours.

Further in accordance with the present invention there is provided a catalyst composite comprising:

A. A gel matrix comprising:

(a) at least 15 weight percent silica, (b) alumina, in an amount providing an alumina-to-silica weight ratio of 15/85 to 80/20, (c) nickel or cobalt, or the combination thereof, in the form of metal, oxide, sulfide or any combination thereof, in an amount of 1 to 10 weight percent of said matrix, calculated as metal, (d) molybdenum or tungsten, or the combination thereof, in the form of metal, oxide, sulfide or any combination thereof, in an amount of 5 to 25 weight percent of said matrix, calculated as metal;

B. A crystalline zeolitic molecular sieve substantially in the ammonia or hydrogen form, substantially free of any catalytic loading metal or metals, said sieve further being in particulate form and being dispersed through said matrix;

said catalyst composite being further characterized by an average pore diameter below 100 Angstroms and a surface area above 200 square meters per gram; said--.

Col. 4, line 37, "exactky" should read --exactly--.

Signed and Sealed this

Seventh Day of September 1976

[SEAL]

Attest:

RUTH C. MASON
*Attesting Officer*

C. MARSHALL DANN
*Commissioner of Patents and Trademarks*